N. Brown,

Friction Roller.

No. 109,866. Patented Dec. 6, 1870.

United States Patent Office.

WILLIAM BROWN, OF PORTSMOUTH, ENGLAND.

Letters Patent No. 109,866, dated December 6, 1870.

IMPROVEMENT IN FRICTION-ROLLERS.

The Schedule referred to in these Letters Patent and making part of the same.

*To all whom it may concern:*

Be it known that I, WILLIAM BROWN, of Portsmouth, in the county of Southampton, England, have invented "Improvements in the Construction of Thrust-Blocks, Plummer-Blocks, and such like mechanism, used in steam-ships, the said improvements being applicable to all kinds of screw and lifting-jacks, and for the bearings of cranes, mill-shafts, and such like machinery;" and I do hereby declare that the following is a full and exact description thereof, reference being had to the accompanying drawing and to the letters of reference marked thereon.

To enable others skilled in the art to make and use my invention, I will proceed to describe its construction and operation.

This invention relates, in the first instance, to the shafts of screw-propellers used in vessels, and is designed to reduce and considerably lessen the extreme friction and heating of the parts employed to take the thrust of the screw when in action.

I propose to remedy the above objections by the following means, that is to say, instead of employing collars on the shaft, embraced at opposite points by grooved recesses formed in strong thrust or plummer-blocks, and making the said recesses each of corresponding size to the said collars, I propose, instead of such said recesses, to adapt small rollers to the said thrust or plummer-blocks at each side of each of the aforesaid collars on the driving-shaft, so that instead of the said collars revolving against the fixed surfaces of the aforesaid recesses they shall revolve against revolving rollers, thereby reducing friction, and, by thus preventing heating of the rubbing parts, economizing a great saving of lubricating material, and also dispensing with the necessity for employing water, as now practiced in large screw vessels, for keeping the rubbing surfaces cool, and also a donkey engine for discharging the bilge-water occasioned by the use of water for that purpose.

The foregoing arrangement applies also to all kinds of screw and lifting-jacks, and for the bearings of cranes, mill-shafts, and other similar machinery employed to support heavy moving bodies.

Description of the Drawing.

At each of the above figures similar letters of reference are employed to denote corresponding parts.

As regards figs. 1, 2, 3, 4—

A marks a strong metal shoe.

B B, the thrust-blocks for carrying the shaft C, on one end of which a screw-propeller is to be fixed.

The blocks B have each a circular channel or recess at *a a* formed therein, in which is placed loosely, side by side, a series of conical-shaped rollers *b b*, which come into contact with the beveled faces *c c* of a collar, D, formed on the shaft C.

E are strong pins and keys for securely connecting the thrust-blocks B B together at the top thereof.

G, holes for bolts for fixing the bottom of the blocks B in the shoe A.

H are holes for fixing the shoe A to a ship's bottom.

Figure 5:
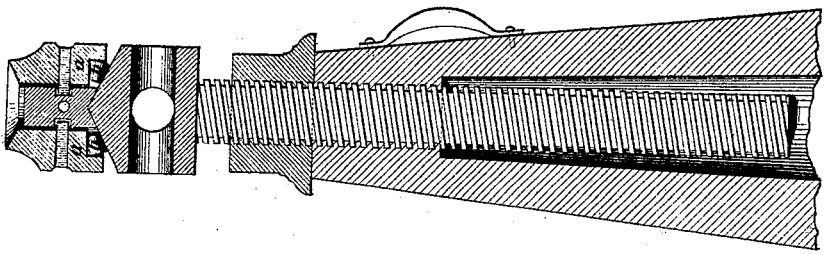
Figure 5 represents a transverse and vertical section of a screw-jack, showing this invention adapted thereto.
Figure 2:
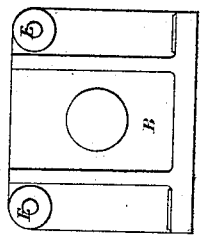
Figure 2, an elevation thereof.
Figure 4:
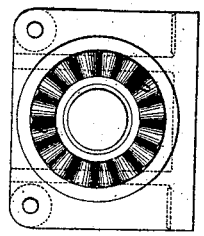
Figure 4, a front elevation of the thrust-block or one-half thereof.
Figure 1:
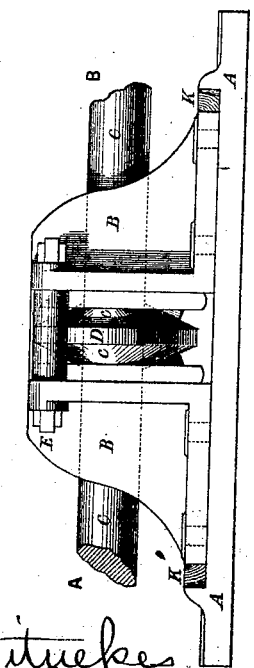
Figure 1 represents a side elevation of a thrust-block adapted for the shafts of screw-propellers.
Figure 3:
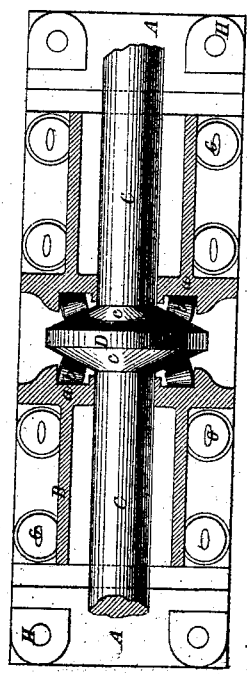
Figure 3, a horizontal plan on the line A B at fig. 1.

The rollers *b* may be made of any metal, but I prefer that they should be made of a different metal to that of which the blocks B are made; for example, suppose the blocks to be of cast-iron, the rollers may be of wrought-iron, steel, or gun-metal, and this applies to the parts shown at fig. 5.

What I claim as my invention, and desire to secure by Letters Patent, is—

1. The collar D, provided with beveled faces *c c* upon the shaft C, in combination with a series of tapering rollers playing between the beveled faces of the collar and the thrust-blocks, substantially as described, for the purpose set forth.

2. The conical rollers *b b*, arranged within the recess or channel of the thrust-blocks, and bearing against the beveled faces *c c* of the collar C upon the shaft D, said shaft having its bearings upon the thrust-blocks B B, the whole combined, arranged, and operating substantially as herein shown and described.

3. The thrust-blocks B, secured together by pins and keys, and mounted upon a shoe, A, as described, in combination with the collar D, formed with beveled faces *c c*, and secured upon the shaft C with a series of conical-shaped rollers interposed and playing within the recess or channel *a*, and bearing against the beveled faces *c c* of the collar, the whole constructed and arranged substantially as set forth.

WILLIAM BROWN.

Witnesses:
   WILLIAM PARSONS,
      31 *St. Mary street, Portsmouth.*
   WILLIAM NEWMAN,
      49 *Cross street, Portsea.*